US012631160B2

(12) United States Patent
Jorn

(10) Patent No.: US 12,631,160 B2
(45) Date of Patent: May 19, 2026

(54) WEB, A WIND TURBINE BLADE AND A MANUFACTURING METHOD THEREOF

(71) Applicant: ENVISION ENERGY CO., LTD, Jiangsu (CN)

(72) Inventor: Baecker Jorn, Silkeborg (DK)

(73) Assignee: ENVISION ENERGY CO., LTD, Jiangsu (CN)

( * ) Notice: Subject to any disclaimer, the term of this patent is extended or adjusted under 35 U.S.C. 154(b) by 0 days.

(21) Appl. No.: 18/873,918

(22) PCT Filed: Aug. 26, 2022

(86) PCT No.: PCT/CN2022/115002
§ 371 (c)(1),
(2) Date: Dec. 11, 2024

(87) PCT Pub. No.: WO2024/040548
PCT Pub. Date: Feb. 29, 2024

(65) Prior Publication Data
US 2025/0354536 A1     Nov. 20, 2025

(51) Int. Cl.
*F03D 1/06*         (2006.01)
*B29C 70/34*         (2006.01)
*B29L 31/08*         (2006.01)

(52) U.S. Cl.
CPC .......... *F03D 1/0684* (2023.08); *B29C 70/345* (2013.01); *F03D 1/0681* (2023.08); *B29L 2031/085* (2013.01); *F05B 2230/23* (2013.01)

(58) Field of Classification Search
CPC .... F03D 1/0684; F03D 1/0679; F03D 1/0675; B29L 2031/085; B29C 70/304; B29C 70/345; B29C 70/443
See application file for complete search history.

(56) References Cited

U.S. PATENT DOCUMENTS 5,843,355 A * 12/1998 McCarville ........... B29C 70/345
                                                      156/212
6,520,706 B1 * 2/2003 McKague, Jr. .... B29D 99/0003
                                                      156/182
(Continued)

FOREIGN PATENT DOCUMENTS

CN          102588220 A      7/2012
CN          109989877 A      7/2019
(Continued)

OTHER PUBLICATIONS

YouTube Video "How to Build a Acoustic Guitar. Episode 8 (Laminating the Sides)" published by Driftwood Guitars on Jul. 2, 2021 (Year: 2021).*

(Continued)

*Primary Examiner* — Sang K Kim
(74) *Attorney, Agent, or Firm* — Meunier Carlin & Curfman LLC

(57)          ABSTRACT

A web (12) is produced by hand layup, resin transfer moulding or vacuum infusion. The web (12) comprises a waved profile (17) defining a plurality of crest and valleys, the stitching yarns (32) thereof may optionally be aligned with the direction of the crests. The web (12) comprises one or more integrated projecting flanges (26) defining a bonding surface for connection with the spar caps (11) of the wind turbine blade (5). This web saves weight and reduces costs. There is also a wind turbine blade (5) and a manufacturing method.

19 Claims, 6 Drawing Sheets

(56)  References Cited

U.S. PATENT DOCUMENTS

|  |  |  |  |  |
|---|---|---|---|---|
| 8,800,924 | B2 | 8/2014 | Groves | |
| 11,231,008 | B2 | 1/2022 | Girolamo | |
| 11,505,301 | B2 * | 11/2022 | Wadsworth | B29C 70/345 |
| 2006/0249626 | A1 * | 11/2006 | Simpson | B64C 3/20 |
|  |  |  |  | 244/123.1 |
| 2010/0239426 | A1 * | 9/2010 | Westergaard | F03D 80/00 |
|  |  |  |  | 416/226 |
| 2013/0064675 | A1 * | 3/2013 | Jaquemotte | F03D 1/0675 |
|  |  |  |  | 264/258 |
| 2017/0320275 | A1 * | 11/2017 | De Waal Malefijt | |
|  |  |  |  | B29D 99/0003 |
| 2019/0195190 | A1 | 6/2019 | Girolamo et al. | |

FOREIGN PATENT DOCUMENTS

|  |  |  |  |  |
|---|---|---|---|---|
| CN | 217055461 | U | 7/2022 | |
| DE | 102017004058 | A1 | 10/2018 | |
| GB | 825392 | A | 12/1959 | |
| NL | 2007438 | C2 * | 3/2013 | F03D 1/0675 |
| WO | 0048830 | A1 | 8/2000 | |
| WO | WO-2025002522 | A1 * | 1/2025 | F03D 7/0298 |

OTHER PUBLICATIONS

International Search Report issued in PCT/CN2022/115002, mailed May 22, 2023.

* cited by examiner

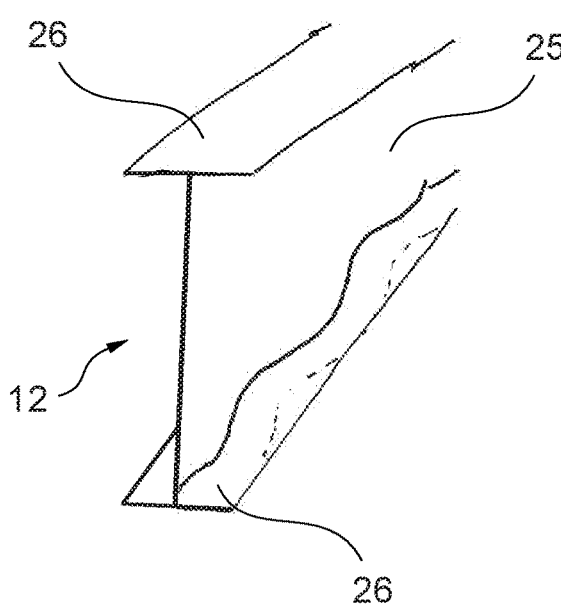
26    25
12
26
Fig. 6
17
Fig. 7
12c    12b
Fig. 8
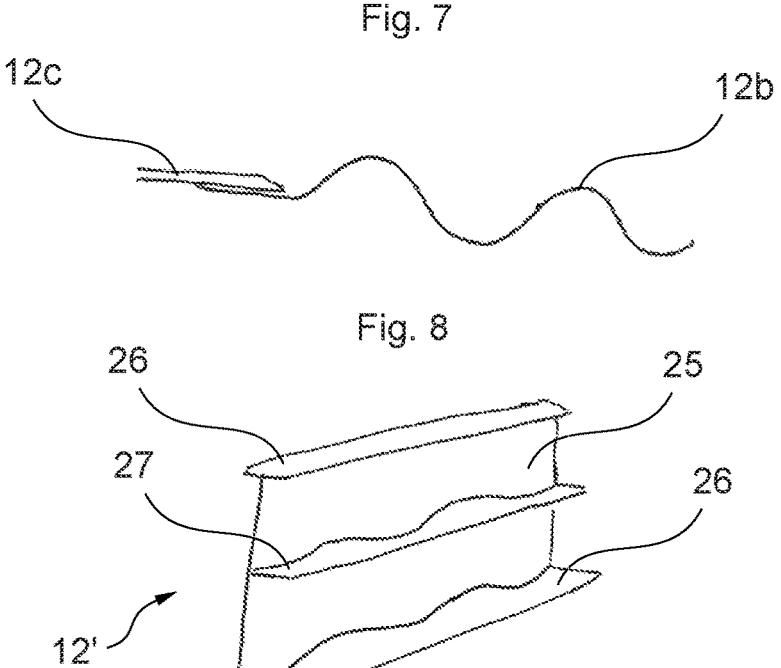
26    25
27    26
12'
Fig. 9

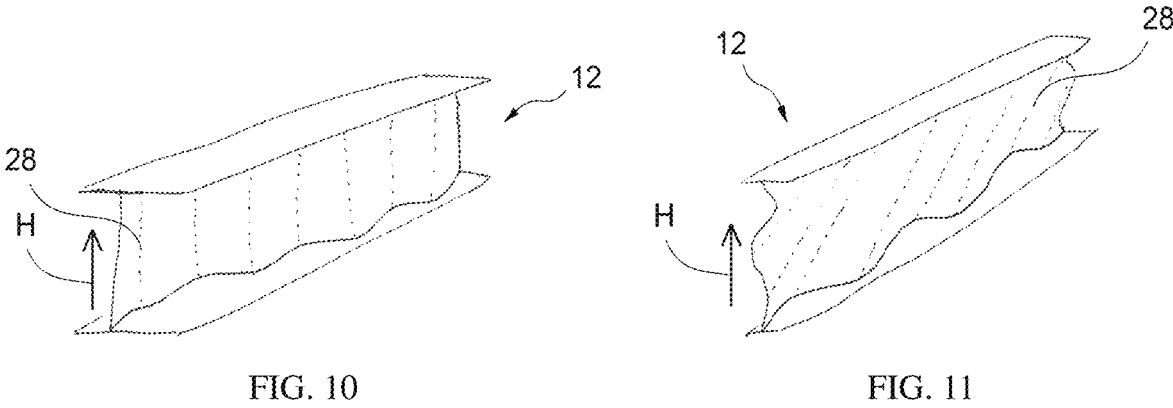
FIG. 10                                    FIG. 11
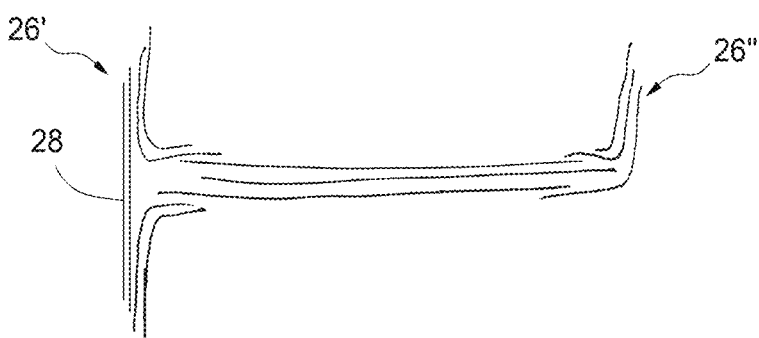
FIG. 12
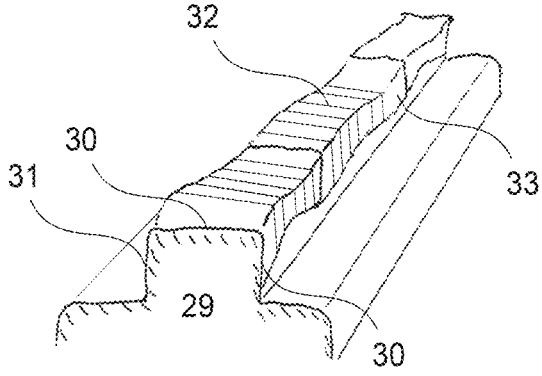
FIG. 13

WEB, A WIND TURBINE BLADE AND A MANUFACTURING METHOD THEREOF

CROSS-REFERENCE OF RELATED APPLICATIONS

The present application is a national phase entry under 35 U.S.C. § 371 of International Application No. PCT/CN2022/115002 filed on Aug. 26, 2022, the entire content of which is hereby incorporated by reference.

FIELD

The present disclosure relates to a web for use in a wind turbine blade and a manufacturing method thereof. The web extends in a longitudinal direction and in a height direction. The web has a laminate structure, which further extends in a thickness direction from a first side surface to an opposite second side surface. The web has an integrated waved profile.

The present disclosure also relates to a wind turbine blade with such web, and a manufacturing method thereof.

BACKGROUND

The use of a waved profile to provide structural strength and save costs and weight is known from many industries. This design is widely used in paper production and packings, where a waved sheet is arranged between two planar sheets to form a sandwich structure. However, the purpose and load requirements of these waved configurations are very different from the wind industry.

It is also known from the aviation industry to use wave-shaped webs in composite wings, where the wave-shaped webs are integrated with the pressure and suction sides of the composite wing. Examples thereof are disclosed in EP 0814018 A2 and WO 2004/000643 A2. Such integrated webs are designed to withstand the compression forces and stresses occurring during takeoff, landing and flight maneuvers, as well as the dynamic forces arising from the fuel located in the wings.

Prior art webs for use in wind turbine blades comprise a sandwich structure where a core material is sandwiched in between outer layers of fibrous material. This results in a thick, bulky web. Further, the costs of conventional core materials have increased in recent years, which in turns increases the costs of such webs. An example of manufacturing such web is disclosed in US 2017/0320275 A1.

EP 2545274 B1 discloses a wind turbine blade with two webs extending between the upper and lower spar caps of the blade shell. The webs are wave-shaped, preferably sinusoidal-shaped, where the waves extend in the entire length of each web. The crest of each wave extends parallel to the thickness direction of the wind turbine blade. The webs are made from a thermoplastic material and are hot-pressed into the desired profile using a hot-press machine.

CN 112012877 A discloses a web arrangement for a wind turbine blade, wherein a wave-shaped reinforcing element is sandwiched between two planar web elements and the spacings in between are filled with a core material. The web elements may be made of a fibre-reinforced material.

CN 113199786 A discloses another web arrangement for a wind turbine blade, wherein individual rib elements are connected to a plate element. Bladders defining the shape of the ribs are arranged on layers of a fibrous material forming the plate, then further layers of fibrous material forming the ribs are laid up over the bladders. The layers of fibrous material are infused with a resin using vacuum infusion and finally cured to form an integrated composite structure. The bladders are deflated and removed from the composite structure after curing.

CN 113107761 A discloses a wind turbine blade with a web arranged between the spar caps. The web is formed by a sheet of steel that is bent into a wave-shaped profile.

CN 102588220 A discloses a method of designing a wind turbine blade with two webs spaced apart where the distance tapers from the root end towards to the tip end. The height of the webs also tapers from the root end towards the tip end. The inner part of each web facing the root end has a wave-shaped profile while the outer part of each web facing the tip end has a straight profile. No details about the manu-facture of the web are provided, it is only implied that the web has a sandwich structure.

EP 1311426 B1 discloses a method of producing an integrated I-shaped structural beam, where a U-shaped web foot with two projecting flanges is arranged at each side edge of a sinus-shaped web. The receiving legs of the web foot are shaped to correspond to the shape of the web, and the projecting flanges of the web foot are arranged on a supporting strip extending the entire length of the web. The web is manufactured by arranging at least two outer layers of a fibrous material with a syntactic or foamed resin layer in between on a first tooling. This sandwich structure is then heated and cured to form a web panel.

The web foot is manufactured by arranging layers of a fibrous material on a second tooling, where the layers continuously extend through the legs and flanges. Further layers of a fibrous material forming the supporting strip are arranged between the web foot and the second tooling. The pre-cured web panel is then positioned between the legs of the web foot, and the web foot and adjacent strip is enclosed by a vacuum bag. Vacuum is applied and a resin matrix material is introduced into the enclosed layers of fibrous materials. The infused structure is set to cure so that the web panel, the web feet and the strip form an integrated beam structure.

The teaching of EP 1311426 B1 is silent about the relative fibre orientation in the web and in the web feet. It is also states that the web panel and strip must be pre-cured to simplify the assembly process and tooling requirements and thus lowering the costs and risk.

U.S. Pat. Nos. 4,084,029 A and 4,734,146 A both discloses a method of producing a composite I-shaped structural beam with a waved configuration for use in aircrafts. U.S. Pat. No. 4,734,146 A discloses that prepreg tapes of a fibrous material are wrapped around a mandrel as it passes through an automated braiding machine. The wrapped structure is optionally heated under vacuum to compact the fibrous material around the mandrel but without initiating the curing of the resin. The wrapped structure is then cut in two halves, each with a central panel and two projecting flanges, which are placed in a back-to-back arrangement. Further fibrous material is positioned at the interface between the two halves to fill up any voids, and additional fibrous material is arranged on top of the further fibrous material and the projecting flanges. The entire structure is then enclosed in a vacuum bag and cured in an autoclave. U.S. Pat. No. 4,084,029 A discloses a similar beam configuration, where prepreg layers of a fibrous material are arranged on a first tooling with the fibres orientated in a +45°/−45° angle relative to the length direction of the beam. It is implied that the layers of fibrous material are heated and cured to form a web panel with integrated flanges using an autoclave. The voids at the interface between two web panels arranged back-to-back are filed with a foam plastic material and a top layer of fibrous material is arranged on top of the foam plastic and projecting flanges. The web panels, the foam plastic and the top layers are bonded together using a second tooling.

The above solutions provide a complex assembly process and require a complex closed mould setup, which increases manufacturing time and costs.

U.S. Pat. No. 5,843,355 A discloses a method of manufacturing a I-shaped web structure with integrated flanges for use in aircrafts. Prepreg layers of a unidirectional thermoplastic material are laid up on a waved mould and heated locally to conform to the moulding surface. The edges of the prepreg layers are cut into a pattern of teeth, which is then folded over the moulding edges to form two opposite facing projecting flanges. Additional prepreg layers of unidirectional thermoplastic material are arranged on a separate cap mould and tacked or taped together. The preformed caps are then arranged top of the projecting flanges and the entire structure is enclosed in a vacuum bag and set to cure in an autoclave.

The above solution requires a time-consuming manufacturing process, that requires the use of a complex cutting and folding process to properly form the flanges. This increases the costs and production time.

EP 2888095 B1 discloses a method for manufacturing an aircraft wing with stiffening elements integrated with the wing shell, where the stiffening element comprises smaller additional laminate layers arranged on the larger laminate layers to form bulges projecting from the side surfaces. Each layer is formed by a prepreg layer of fibre-reinforced material. The stiffening element has integrated flanges projecting from each edge, which are arranged on the adjacent inner surface of the wing structure. The entire wing structure is then enclosed in a vacuum bag and set to cure in an autoclave.

The above solution requires a time-consuming and complex manufacturing process, that requires the use of a complex autoclave. This increases the costs and production time.

Therefore, there is a need for an improved web design for wind turbine blades that reduces the overall weight and costs and allows for a fast and easy production.

SUMMARY

An object of an embodiment of the present invention is achieved by a method of manufacturing a web for use in a wind turbine blade, the web extending in a length direction and in a height direction, the web further extends in a thickness direction arranged perpendicular to the length and height directions, where the method comprises:

arranging a laminate of layers on a mould, wherein the laminate of layers comprises at least one layer of a first fibrous material and the mould has a first moulding surface shaped to form at least one waved profile of the web, the at least one waved profile defines a plurality of crests and/or valleys;

introducing a resin matrix material into the laminate of layers under vacuum or by hand, preferably before applying vacuum to the infused laminate of layers; and curing the infused laminate of layers to form a web with a waved profile, wherein the web is manufactured by hand lay-up, resin transfer moulding or vacuum infusion, and optionally the at least one layer is arranged so that the stitching yarns thereof extend in a yarn direction parallel to the direction of the crests.

This provides a fast and easy method of producing waved webs for use in a wind turbine blade, which allows for the use of existing production techniques. The present manufacturing method can thus be easily implemented into existing production facilities for wind turbine blades, which in turn reduces production costs and time.

This eliminates need for expensive core materials as the waved configuration provides buckling stability to the web. Thereby saving weight and costs as the web comprises a laminate of dry layers. More fibrous materials may simply be added to the laminate to increase the structural strength of the web, and optionally to achieve the same linear mass density as the conventional sandwich structure.

The present web may advantageuously be manufactured in a dedicated mould using a hand lamination process where the layup of layers of fibrous material and the resin impregnation of the fibrous material may be performed manually. The infused laminate structure may optionally be enclosed by a vacuum bag and vacuum may be established using one or more vacuum pumps. Alternatively, the resin matrix material may be introduced under vacuum using a resin transfer moulding (e.g., Light RTM) process or a vacuum infusion process. After which the infused laminate structure is then set to cure to form the final web structure. This allows for a simple and cost-effective production of webs with improved quality and structural stability.

In one embodiment, the at least one layer is arranged so that the stitching yarns thereof extend in a yarn direction parallel to the direction of the crests.

The individual layers of fibrous material may be arranged so that the direction of the stitching yarns thereof is orientated parallel to the direction of the crests and/or valleys of the waves. This allows for an optimal draping over the waves while reducing the risk of wrinkles or delamination occurring in the laminate. This allows for easy handling and eliminates the need for locally heating the layers during layup.

The layup of the individual layers may be performed manually by the work-ers or by an automated robotic system, or a combination thereof. This allows the layup process to be adapted to different web designs and production techniques.

The induvial layers used may be dry or wet layers of fibrous material, optionally partly or fully reimpregnated with a matrix material before the layup. The matrix material may be a bonding agent, e.g., an adhesive, or a polymer resin, e.g., a thermoplastic or thermosetting resin. The composition of the layers may thus be adapted to the selected manufacturing process.

In one embodiment, the direction of the crests and/or valleys is arranged either parallel to or at an angle relative to the height direction of the web.

The waves form a number of crests and/or valleys extending more or less parallel to each other, where each wave has a predetermined amplitude, wavelength and cross-sectional profile. The crests and/or valleys extend in a direction relative to the height direction of the web. For example, the direction of the crests and/or valleys may be arranged parallel to the height direction. The direction of the crests and/or valleys may also be arranged at an angle, preferably an inclined angle, relative to the height direction. For example, the angle may be selected between −90° to +90°, between −60° to +60°, between −45° to +45°, between −30° to +30°, or any angles in between. This allows the wave profile to be adapted to different web designs and loadings of the wind turbine blade.

Optionally, the direction of the crests and/or valleys of the waves may vary between different wave patterns and/or wave sections of the web. Alternatively, the direction of the crests and/or valleys may be the same for all wave patterns and/or wave sections of the web.

In one embodiment, the laminate of layers further comprises at least one layer of a core material and/or at least one layer of a second material that differs from said first fibrous material.

The laminate of layers may only comprise layers of a first fibrous material. Alternatively, additional layers may be arranged within the laminate together the layers of the first fibrous material. The additional layers may be one or more layers of a second fibrous material, one or more core layers, one or more flow meshes, or any combinations thereof. This allows the web structure to be adapted to different applications and blade designs.

The first and second fibrous materials may be fabrics with continuous fibres orientated in a unidirectional, biaxial, or multiaxial direction. The first and second fibrous materials may also be fabrics with chopped strands of fibres, where the strands are randomly orientated and have continuous or discontinuous lengths, such as CSM or CFM. The fibres may be made of glass, carbon, aramid, natural fibres or another suitable material.

The flow mesh may be a flow media capable of controlling the resin flow through the laminate. The core layer may be a thin core material capable of adding strength to the laminate, for example comprising a pressure stable core structure. The core layer may optionally also function as a flow media. This allows for the use of less core material compared to conventional webs.

In one embodiment, excess fibres are cured before or after the step of introducing the resin matrix material.

After the completion of the layup process, excess fibres may be cut away before the resin matrix material is introduced. Alternatively, this may be done after completion of the resin introduction process. The excess fibres may be removed using standard cutting tools. This eliminates or at least significantly reduces the amount of grinding needed after the web structure is cured.

Conventional web structures, such as disclosed in U.S. Pat. Nos. 4,084,029 A and 4,734,146 A, require additional post-curing steps for removing any excess material. This increases the production time and costs. By removing any excess fibre material and/or resin matrix material before the curing process, then amount of post-curing work can be reduced to a minimum.

In one embodiment, the mould further has at least one second moulding surface shaped to form at least one projecting flange of the web, wherein either the laminate of layers extends further along the second moulding surface or a further laminate of layers extends along the second moulding surface.

The mould may comprise a first moulding surface for shaping a waved web panel and further at least a sound moulding surface for shaping at least a projecting flange. A single second moulding surface may be arranged at one edge of the web panel and project from one side of the web panel. Alternatively, a second moulding surface may be arranged at each edge of the web panel and project from the same side or opposite sides of the web panel. This allows the web to be manufactured with one or more integrated bonding flanges.

The first moulding surface are further shaped to form the ends of the web panel in the length direction. The first moulding surface may optionally be shaped to form a straight end profile at one or both ends of the web panel. Alternatively, one or both ends may be shaped to form a curved end profile for added shear stability.

The layers at the first moulding surface may extend further along this second moulding surface to a continuous laminate of layers. Alternatively, another set of layers may be arranged on the second moulding surface, which may intersect with the layers on the first moulding surface. This allows the bonding flange to be integrated with the web panel.

Alternatively, the projecting flanges may be bonded or infused to the web panel in a subsequent assembly or infusion step. This provides a flexible method of producing the web with flanges.

In one embodiment, a top plate is temporary positioned on top of the layers at the second moulding surface before applying vacuum, and the top plate is removed again after curing.

A temporary top plate may be positioned at the top side of the layers forming the flange. The top plate may comprise a flexible structure or be made from a flexible material, such as rubber. Alternatively, the top plate may be made from a relative stiff material, such as plastics. The top plate may correspond to the length and width of the respective flange. This allows the layers to be compacted and reduces the amount of resin needed to infuse the layers of the projecting flange. This may be use-ful during the hand lay-up process but can also be used during other process.

The top plate may be removed after the curing process is complete. Thereby forming a bonding surface for bonding the web to the respective spar cap of the blade shell.

The top plate may extend beyond the width of the respective flange so that it projects outwards from the opposite side of the web in the thickness direction. The top plate may thus form a third moulding surface for forming a projecting flange on the opposite side of the web. Thereby enabling the web to be provided with integrated flanges on both sides of the web panel.

Additional layers may be arranged on the first moulding surface, which may extend further along this third moulding surface to a continuous laminate of layers. Alternatively, another set of layers may be arranged on the third moulding surface, which may intersect with the layers on the first moulding surface. This allows the bonding flange to be integrated with the web panel.

In one embodiment, at least one top layer of a third fibrous material is arranged over the layers at the second moulding surface, the at least one top layer extends in the length and thickness directions and define a bonding surface of the at least one projecting flange.

One or more top layers of a fibrous material may be arranged between the top plate and the layers on at least the second moulding surface. Top layers may preferably extend along the layers on both the second and third moulding surface, thus forming a continuous top surface of the web which increases the bonding area with the spar cap. The fibrous material may be the same as mentioned earlier in the application.

In one embodiment, a gusset or filler material is arranged at a transition area between the first and second moulding surfaces, the gusset or filler material being adapted to fill any voids in that transition area.

Optionally, any voids in the transition area between the web panel and the projecting flange or flanges may be filled with a filler material. The filler material may be a fibrous material, or another suitable material or structure. This reduces the risk of resin accumulating in the laminate structure.

An object of an embodiment of the present invention is also achieved by a web for use in a wind turbine blade, the web extending in a length direction and in a height direction, the web further extends in a thickness direction arranged perpendicular to the length and height directions, wherein the web has a laminate of layers forming at least one waved profile defining a plurality of crests and valleys, wherein the web is manufactured as describe above.

This provides a waved web that is cheap and fast to produce and eliminates the need for thick core materials. This also reduces the environmental impact as no expensive core materials are needed. This saves weight and costs compared to conventional webs. The web comprises a laminate of layers which allows easier handling during layup and allows the layers to drape over the moulding surface without the use of heating.

The web extends in a length direction from a first end to a second end and further in a height direction from a first edge to a second edge, and the laminate has a thickness measured in a thickness direction between a first side surface and a second side surface. The web comprises a laminate with an integrated waved profile formed by a plurality of waves defining a number of crests and/or valleys extending in a direction relative to the height direction. The crests and/or valleys may be orientated as described above.

For example, the waves may only form crests or valleys projecting to one side, where the individual crests or valleys may be arranged continuously or be spaced apart by a predetermined distance. Preferably, the waves may form both crests and valleys arranged continuously along the web panel.

In one embodiment, the web comprises a first flange and a second flange, the first and second flanges project from one side of the web or from opposite sides of the web.

The present web may one or more integrated bonding flanges projecting form one or both sides of the web, as described above. The flanges may extend along one or both edges of the web panel and act as web feet for contacting the spar cap. The flanges may follow the waved profile and/or have a straight profile in the length direction. This increases the bonding area and reduces the risk of cracks or separations occurring at the bonding area. This also allows for a better load transfer between the flanges and the web panel.

In one embodiment, a stringer or another flange is further arranged on the waved profile at a predetermined height, the stringer or flange extends in the length direction and further in the thickness direction.

One or more stringers or further flanges may be arranged at the waved profile between the first and second edges. The stringer or flange may extend in the length direction and may be arranged parallel or at an angle relative to the length direction of the web. For example, the angle may be selected between −90° to +90°, between −60° to +60°, between −45° to +45°, between −30° to +30°, or any angles in between. This provides added strength to the web and the orientation of these stringers or flanges may be adapted to the orientation of the respective waves. This also allows for increased buckling stability at the bonding flange as the stringer or further flange may be used for support of the lightning cables, electrical cables, tubes or oth-ers.

The stringers and/or the further flanges may be integrated into the web structure during the manufacturing process. For example, one or more of the layers on the first moulding surface and/or additional layers of a fibrous material may be arranged to form the respective stringer or flange. Optionally, additional moulding parts may be positioned on the layers at the first moulding surface and used to provide support for the layers forming the stringer or flange. The resin matrix material may then be introduced into the fibrous material, preferably together with the rest of the fibrous material, and set to cure.

Alternatively, the stringers and/or flanges may be joint to the web panel by fasteners, adhesive, over lamination, or another technique.

In one embodiment, the amplitude, wavelength, and/or profile of the respective waves varies in the length direction and/or in the height direction.

The orientation, size and shape of the individual waves may be adapted to shear requirements as well as different web designs. For example, the amplitude, the wavelength and/or the cross-sectional profile of the respective waves may be uniform or vary along the direction of the waves. The waves may extend the entire height between the first and second edges. Alternatively, the waves may at one or both local ends smoothly transform into a straight edge profile.

For example, the waves may have a maximum amplitude and/or wavelength at the middle and/or a minimum amplitude and/or wavelength at the local ends of the waves. For example, the amplitude and/or wavelength of the waves may gradually taper from the first end to the second end. This allows the waves to be designed for optimal shear stress distribution.

For example, the waved profile may comprise carrier waves and secondary waves superimposed onto the carrier waves. The carrier waves may have an amplitude, wavelength and/or profile that differs from the amplitude, wavelength and/or profile of the secondary waves. The waves may have a sinuous, radius segmented, zig-zag, stepped, or triangular profile.

In one embodiment, the web comprises a first wave pattern and at least a second wave pattern, the second wave pattern differs from the first wave pattern.

The web may comprise a single waved section with a wave pattern extending partly or fully in the length direction. Alternatively, the web may comprise two or more waved sections, each with a wave pattern, distributed along the length of the web. The individual waved sections may have different wave patterns or uniform wave patterns. For example, one wave pattern located towards the first end may have a larger amplitude and/or wavelength then another wave pattern located towards the second end, or vice versa. This also allows the waves to be designed for optimal shear stress distribution.

In one embodiment, the web comprises at least one waved web section and at least one other web section, the at least one other web section being a waved web section or a straight web section.

The web may comprise one or more waved web sections combined with one or more straight web sections and/or one or more further waved web sections. The waved web sections may be integrated with the other web sections to form a continuous web. Alternatively, the respective waved and/or straight web sections may be joint together by fasteners, adhesive, over lamination, or another technique.

For example, a straight or waved web section may be arranged at one end of the web adjoining another waved web section. For example, a straight web section may be arranged at one end of the web where a waved web section may be arranged at the other end. For example, the waved and straight web sections may be arranged in an alternating order in the spanwise direction. One or more of the straight web sections may comprise a sandwich structure. Optionally, the waved web section may be joined with a web foot having a sandwich structure at one or both edges. This allows for a smooth transition between the laminate structure and the sandwich structure.

An object of an embodiment of the present invention is further achieved by a wind turbine blade comprising a blade shell defining a pressure side and a suction side, the blade shell extends from a leading edge to a trailing edge in a chordwise direction and further from a root end to a tip end in a spanwise direction, where at least one web is arranged inside the blade shell and is connected to a spar cap at the pressure side and to a spar cap at the suction side, wherein the at least one web is a web configured as described above.

This provides a wind turbine blade with a waved web having a laminate structure as described above. This saves weight and costs as the waved configuration provides buckling stability to the web compared with conventional webs.

The wind turbine blade may comprise one or more web arranged relative to each other in the chordwise direction. For example, one or more shear webs may be arranged between the respective spar caps of the blade shell. For example, one or more reinforcing webs may be arranged between the blade shell at a distance from the leading edge and/or trailing edge for added support.

The web may be arranged so that the height direction corresponds to the thickness direction of the wind turbine blade. The length direction of the web may correspond to the spanwise direction of the wind turbine blade. Further, the thickness direction of the web may correspond to the chordwise direction of the wind turbine blade.

In one embodiment, one or both spar caps comprise a straight profile or a waved profile in the spanwise direction, or said one or both spar caps comprise a straight or waved inner surface.

The spar cap at the pressure side and/or at the suction side may comprise a lengthwise profile, e.g., a straight profile, that follows the geometrical profile of the wind turbine blade. Alternatively, the spar cap at the pressure side and/or at the suction side may one or more waved profiles that extend partly or fully along the length of the spar cap. The waved profile may add buckling stability to the blade shell and potentially reduce the risk of delamination in the spar cap area.

The waved configuration of each spar cap may correspond to the waved configuration of each edge of the web, respectively. For example, the waves at the pressure side may be aligned with the waves at the first edge of the web. For example, the waves at the suction side may be aligned with the waves at the second edge of the web. Alternatively, the spar cap may comprise a waved configuration that differs from the waved configuration of the web. This may allow for a more optimal transfer of loads and stresses between the spar cap and the web.

In one embodiment, the amplitude and/or the wavelength of the waved profile in the spar caps gradually tapers from the root end towards to the tip end.

This further allows the waves at the blade shell to be adapted to the geometrical profile of the wind turbine blade to allow for an optimal load transfer. The waved profile may be incorporated into the mould of the spar cap and/or the wind turbine blade. Thereby, providing a spar cap with integrated waves.

The spar cap may comprise a waved profile defining only crests or valleys projecting from one side of the spar cap. The other side may have a planar surface profile. Alternatively, the waved profile may define crests and valleys that project from both sides of the spar cap. The outer skin layers of the blade shell receiving the spar cap may further have a waved profile that follows the waved profile or planar surface profile of the spar cap.

DESCRIPTION OF THE DRAWING

Embodiments of the invention is described by example only and with reference to the drawings, wherein:

FIG. 6 shows the web with integrated flanges projecting from both sides,

FIG. 7 shows various embodiments of the waved profile,

FIG. 8 shows the web with a waved web section connected to a sandwich-based web section, FIG. 9 shows the web with a further flange arranged on the waved profile, FIG. 10 shows the web with waves aligned with the height direction, FIG. 11 shows the web with waves angled relative to the height direction, FIG. 12 shows the web with various embodiments of the flanges, FIG. 13 shows a first embodiment of a mould for manufacturing the web.

In the following text, the figures will be described one by one, and the different parts and positions seen in the figures will be numbered with the same numbers in the different figures. Not all parts and positions indicated in a specific figure will necessarily be discussed together with that figure.

DETAILED DESCRIPTION OF THE EMBODIMENTS

Figure 1:
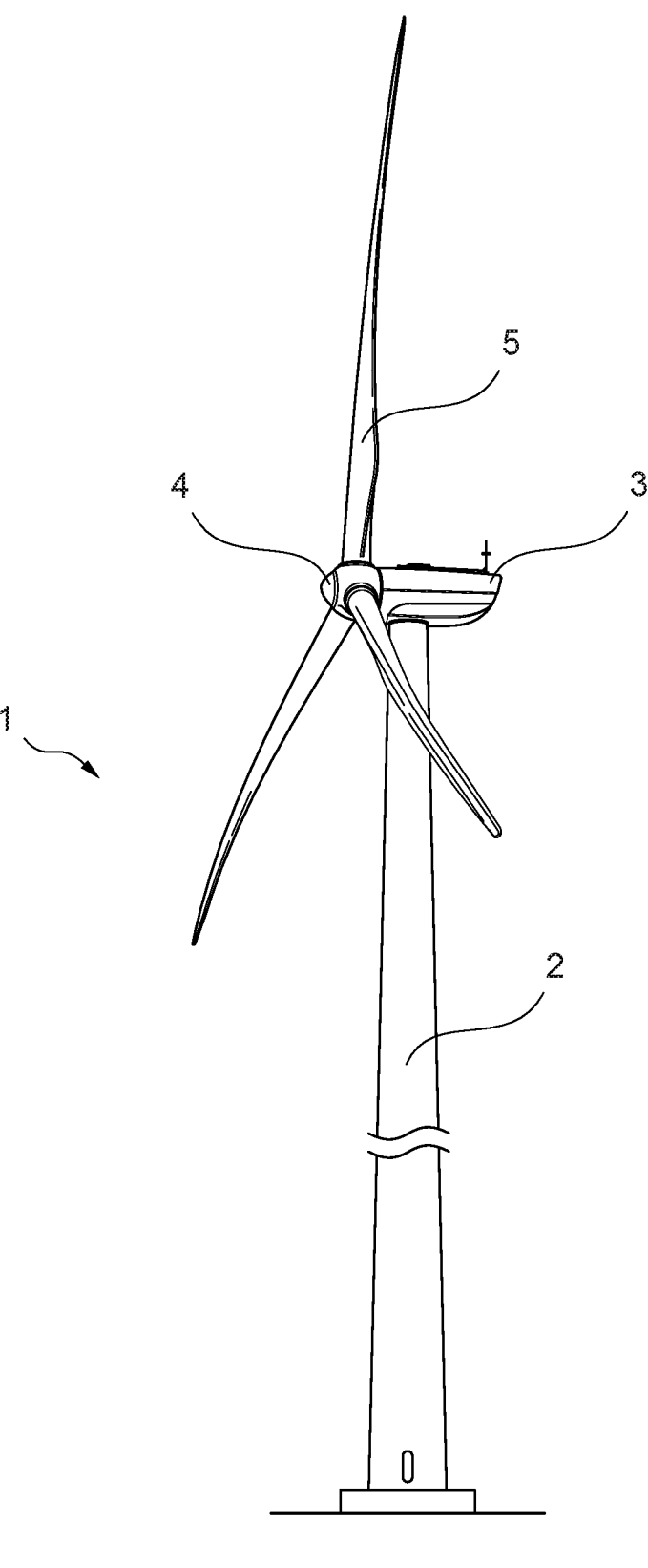
FIG. 1 shows an exemplary embodiment of a wind turbine blade.

FIG. 1 shows an exemplary embodiment of a wind turbine 1 comprising a wind turbine tower 2, a nacelle 3 arranged on top of the wind turbine tower 2, and a rotor connected to a drive train in the nacelle 3. The rotor comprises a hub 4 and at least one wind turbine blade 5 connected to the hub 4. Here, three wind turbine blades 5 are shown, but the hub may be connected to more or less wind turbine blades.

The wind turbine 1 is here shown as an onshore wind turbine, but the wind turbine 1 may also be an offshore wind turbine 1.

Figure 2:
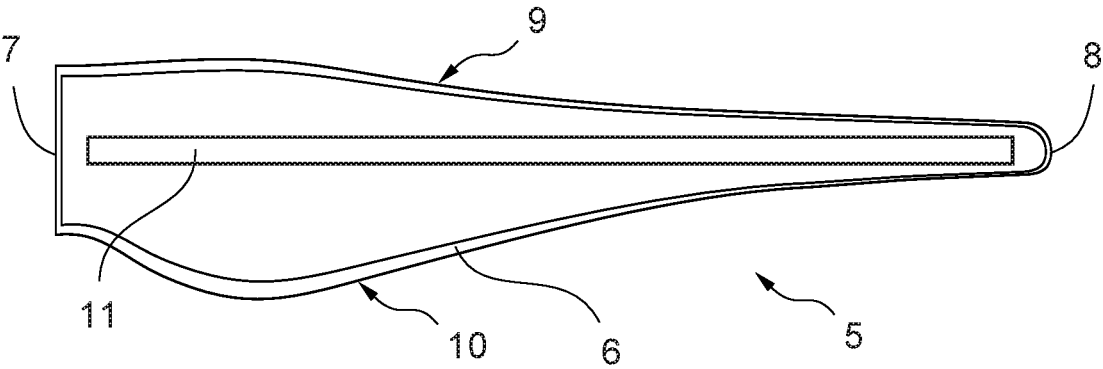
FIG. 2 shows a blade shell of the wind turbine blade with a spar cap.

FIG. 2 shows a blade shell 6 of the wind turbine blade 5 with a spar cap 11 integrated or bonded to the aerodynamic portion of the blade shell 6. Here only one spar cap is illustrated but the blade shell may comprise more or less than one spar cap. The blade shell 6 may be continuous blade shell or comprise two or more shell por-tions. The blade shell 6 extends from a first end 7, e.g., the root end, to a second end 8, e.g., the tip end, in a spanwise direction. The blade shell 6 further extends from a first edge 9, e.g., the leading edge, to a second edge 10, e.g., the trailing edge, in a chordwise direction.

Figure 3:
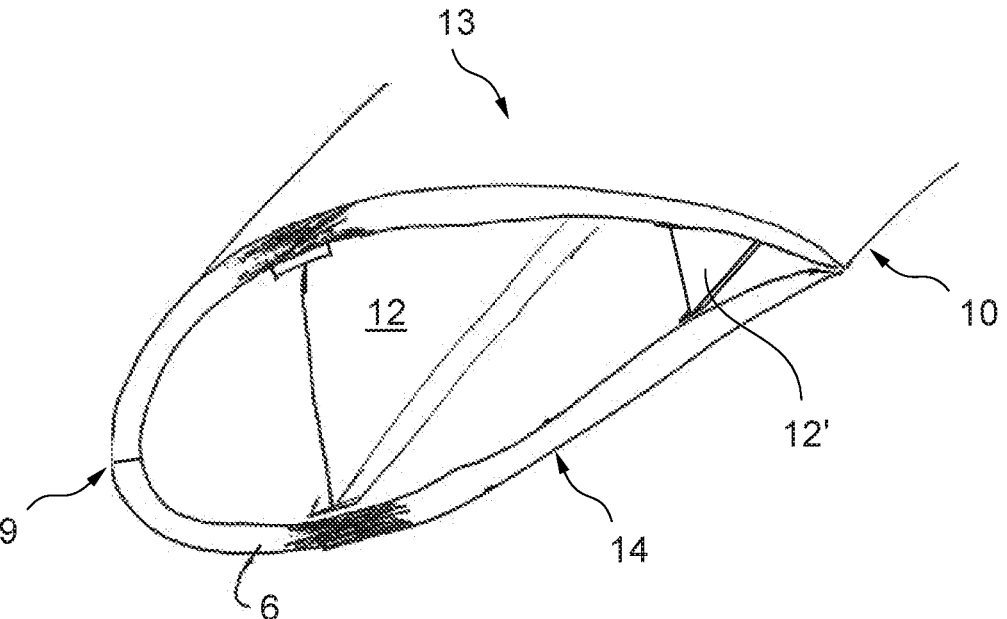
FIG. 3 shows the blade shell with two reinforcing webs.

FIG. 3 shows the blade shell 6 with two reinforcing webs 12, 12' arranged within the blade shell 6. The blade shell 6 forms a pressure side 13 comprising an upper spar cap and a suction side 14 comprising a lower spar cap.

A shear web 12 extends between the upper and lower spar caps in a thickness direction. The shear web 12 is bonded or integrated with the upper and lower spar caps, respectively. Here only one shear web is illustrated but the wind turbine blade may comprise more or less than one shear web.

Optionally, one or more reinforcing webs 12' are further arranged within the blade shell 6. The reinforcing webs 12' are positioned at a distance from the leading edge 9 and/or the trailing edge 10. The reinforcing webs 12' are bonded or integrated to the pressure and suction sides 13, 14 of the blade shell 6.

Figure 4:
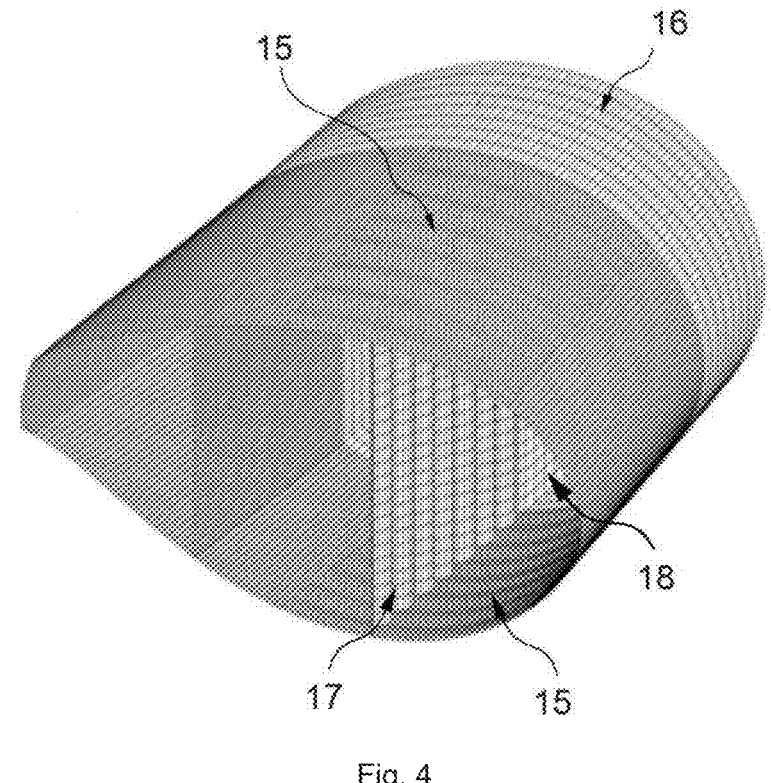
FIG. 4 shows a waved profile of the spar cap and the web.

FIG. 4 shows a waved profile of the spar cap 11 and of the web 12. Here, only a portion of the wind turbine blade 5 is shown. Here, the wind turbine blade 5 comprises a flatback profile at the trailing edge 10.

The spar cap 11 comprises a spar cap section with an integrated first profile 15 and another spar cap section with an integrated second profile 16. Here, the first and second profiles 15, 16 may both have a straight profile but they may have different profiles.

Further, the web 12 is shaped as a shear web comprising a web section with an integrated waved profile 17 and another web section with an integrated straight profile 18. The waved profile 17 is formed by a plurality of waves having a predetermined amplitude, wavelength and profile. Here, the waves of the waved profile 17 extend in the height direction.

Figure 5:
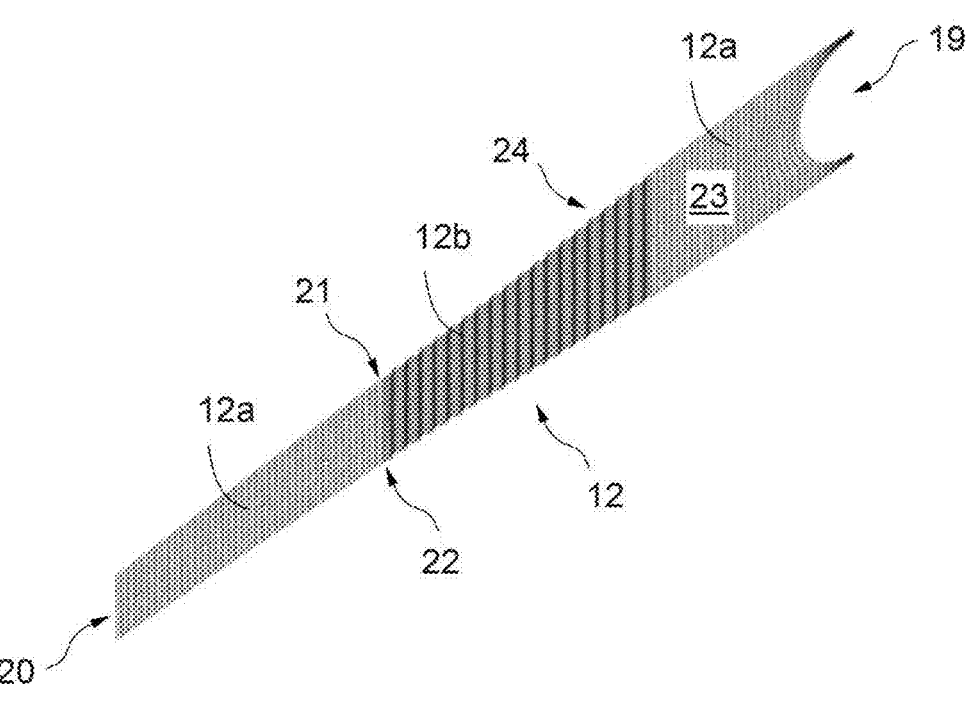
FIG. 5 shows the web with a waved web section and straight web sections.

FIG. 5 shows the web 12 with a waved web section 12*b* and straight web sections 12*a*. The web 12 extends from a local first end 19 to a local second end 20 in a length direction. The web 12 extends further from a first edge 21 to a second edge 22 in a height direction. The web 12 has a laminate of layers with a thickness measured between a first side surface 23 and a second side 24.

The laminate comprises at least one layer of a fibrous material. Optionally, the laminate comprises additional layers arranged relative to the first layer of fibrous material. The layers of fibre material are impregnated with a resin matrix material under vacuum or manually before applying vacuum.

FIG. 6 shows the web 12 with integrated flanges 26 projecting from both sides of the web panel 25. The flanges 26 act as web feet and form a bonding area for bonding to the inner surface of the spar cap 11.

The flanges 26 extend along the length of the web 12 and have a local width measured in the thickness direction of the web 12. The edge profile of the flanges 26 may follow the waved profile 17 of the web 12, as indicated by the dotted lines. The edge profile of the flanges 26 may also have a straight profile in the length direction, as indicated by the solid lines.

FIG. 7 shows various embodiments of the waved profile 17 of the web 12. As illustrated, the waves may have a sinuous, triangular, stepped or trapezoid shape. The waves may also comprise one or more radius segments, or a secondary wave profile superimposed on a carrier wave profile. The waves may also comprise a plurality of adjoining crests and/or valleys. Alternatively, the crests and/or valleys may be spaced apart.

FIG. 8 shows the web 12 with a waved web section 12*b* connected to a sandwich-based web section 12*c*. The laminate structure of the waved web section 12*b* may be connected to the sandwich structure of the web section 12*c* by over lamination, bonding and/or co-fusion.

FIG. 9 shows the web 12' with a further flange 27 arranged on the waved profile 17. The flange 27 is positioned at a distance from the first or second edge 21, 22 and is arranged relative to the direction of the waves. Here, the flange 27 is arranged on only one side of the web panel 25, but the flange 27 may be arranged on both sides of the web panel 25.

FIG. 10 shows the web 12 with waves aligned with the height direction. The waves of the web 12 form a plurality of crests and/or valleys that extend in a direction parallel to the height direction of the web 12.

FIG. 11 shows the web 12 with waves angled relative to the height direction. The crests and/or valleys of the web 12 extend in a direction angled relative to the height direction of the web 12. The angle may an inclined angle.

FIG. 12 shows the web 12 with various embodiments of the projecting flanges 26. The flanges 26 may be arranged on only one side of the web panel 25. The flanges 26 may also be arranged on both sides of the web panel 25.

The flanges 26 may be connected to the web panel 25 in a post-curing step, as indicated in FIG. 12. The flanges 26 may also be formed as continuous layers of fibrous material, as indicated in FIGS. 13-16.

One or more to layers 28 of a fibrous material are optionally arranged on top of the layers forming the flanges 26. The top layers 28 extend along the length and width of the projecting flanges 26.

FIG. 13 shows a first embodiment of a mould 29 for manufacturing the web 12. The mould 29 has a first moulding surface 30 shaped to form the waved profile 17 of the web panel 25. The mould 29 further comprises a second moulding surface 31 shaped to form the projecting flanges 26. Here, a second moulding surface 31 is arranged on both edges of the first moulding surface 20.

As illustrated, the individual dry layers 33 of fibrous material are arranged on the first moulding surface 30 so that the stitching yarns 32 are orientated parallel to the direction of the crests and/or valleys of the waved profile 17. The dry layers 33 are draped over the waves on the first moulding surface 30 and extend further along the second moulding surfaces 31.

Figure 14:
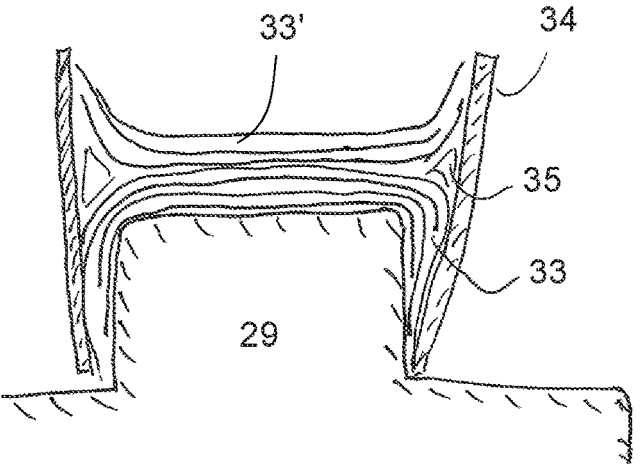
FIG. 14 shows the mould with an I-shaped web structure before infusion.

FIG. 14 shows the mould 29 with an I-shaped web structure before infusion, where a top plate 34 is positioned adjacent to the top layers 28, or directly on the layers 33 extending along the second moulding surface 32. Here, the second moulding surfaces 31 project from the same side of the first moulding surface 30.

A gusset 35 or filler material is arranged at the transition area between the first and second moulding surfaces 30, 31 to fill any voids.

Further dry layers 33' of a fibrous material are arranged on the layers 33 already arranged on the first moulding surface 30. The further layers 33' extend further along a third moulding surface on the top plates 34 to form the opposite facing flanges 26.

The entire structure is then enclosed by one or more moulding parts or via a vacuum bag. A resin matrix material is then introduced into the layers of fibrous material using a resin transfer moulding (RTM) process or vacuum infusion. Alternatively, the resin matrix material is introduced using a hand-impregnation layup process. Optionally, the infused structure is enclosed by a vacuum bag and vacuum is established via a vacuum pump. The infused structure is then set to cure to form the final web structure.

Figure 15:
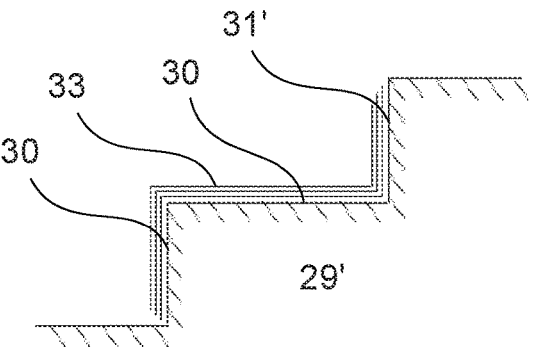
FIG. 15 shows a second embodiment of the mould.

FIG. 15 shows a second embodiment of the mould 29' where the second moulding surfaces 31 project from opposite sides of the first moulding surface 30. This allows one edge to be provided with a flange 26 projecting from only one side of the web panel 25. The other edge allows the web panel 25 to be provided with a flange 26 that project from one or both sides of the web panel 25.

Figure 16:
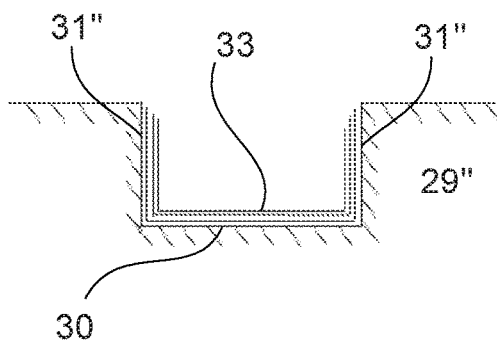
FIG. 16 shows a third embodiment of the mould.

FIG. 16 shows a third embodiment of the mould 29" where the second moulding surfaces 31 project from the same side of the first moulding surface 30. This allows both edges to be provided with a flange 26 projecting from only one side of the web panel 25.

The invention claimed is:

1. A method of manufacturing a web for use in a wind turbine blade, the web extending in a length direction and in a height direction, the web further extending in a thickness direction arranged perpendicular to the length and height directions, wherein the method comprises:

arranging a laminate of layers on a mould, wherein the laminate of layers comprises at least one layer of a first fibrous material and the mould has a first moulding surface shaped to form at least one waved profile of the web, the at least one waved profile defines a plurality of crests and/or valleys;

introducing a resin matrix material into the laminate of layers under vacuum or by hand, preferably before applying vacuum to the infused laminate of layers; and curing the infused laminate of layers to form a web with a waved profile, wherein the web is manufactured by hand lay-up, resin transfer moulding or vacuum infusion;

wherein an extending direction of the crests and/or valleys is arranged at an angle relative to the height direction of the web.

2. The method according to claim 1, wherein the at least one layer is arranged so that stitching yarns thereof extend in a yarn direction parallel to an extending direction of the crests.

3. The method according to claim 1, wherein the laminate of layers further comprises at least one layer of a core material and/or at least one layer of a second material that differs from said first fibrous material.

4. The method according to claim 1, wherein excess fibres are cut before or after the step of introducing the resin matrix material.

5. The method according to claim 1, wherein the mould further has at least one second moulding surface shaped to form at least one projecting flange of the web, wherein either the laminate of layers extends further along the second moulding surface or a further laminate of layers extends along the second moulding surface.

6. The method according to claim 5, wherein a top plate is temporary positioned on top of the layers at the second moulding surface before applying vacuum, and the top plate is removed again after curing.

7. The method according to claim 5, wherein at least one top layer of a third fibrous material is arranged over the layers at the second moulding surface, the at least one top layer extends in the length and thickness directions and define a bonding surface of the at least one projecting flange.

8. The method according to claim 1, wherein a gusset or filler material is arranged at a transition area between first and second moulding surfaces, the gusset or filler material being adapted to fill any voids in that transition area.

9. A web for use in a wind turbine blade, the web extending in a length direction and in a height direction, the web further extending in a thickness direction arranged perpendicular to the length and height directions, wherein the web has a laminate of layers forming at least one waved profile defining a plurality of crests and valleys, and the web is manufactured according to the method in claim 1.

10. The web according to claim 9, wherein the web comprises a first flange and a second flange, the first and second flanges project from one side of the web or from opposite sides of the web.

11. The web according to claim 9, wherein a stringer or another flange is further arranged on the waved profile at a predetermined height, the stringer or flange extends in the length direction and further in the thickness direction.

12. The web according to claim 9, wherein the amplitude, wavelength, and/or profile of the respective waves varies in the length direction and/or in the height direction.

13. The web according to claim 9, wherein the web comprises a first wave pattern and at least a second wave pattern, the second wave pattern differs from the first wave pattern.

14. The web according to claim 9, wherein the web comprises at least one waved web section and at least one other web section, the at least one other web section being a waved web section or a straight web section.

15. A wind turbine blade comprising a blade shell defining a pressure side and a suction side, wherein the blade shell extends from a leading edge to a trailing edge in a chordwise direction and further from a root end to a tip end in a spanwise direction, at least one web is arranged inside the blade shell and is connected to a spar cap at the pressure side and to a spar cap at the suction side, and the at least one web is a web according to claim 9.

16. The wind turbine blade according to claim 15, wherein one or both spar caps comprise a straight profile or a waved profile in the spanwise direction, or said one or both spar caps comprise a straight or waved inner surface.

17. The wind turbine blade according to claim 15, wherein the amplitude and/or the wavelength of the waved profile in the spar caps gradually tapers from the root end towards to the tip end.

18. The wind turbine blade according to claim 15, wherein the web comprises a first flange and a second flange, the first and second flanges project from one side of the web or from opposite sides of the web.

19. The wind turbine blade according to claim 15, wherein a stringer or another flange is further arranged on the waved profile at a predetermined height, the stringer or flange extends in the length direction and further in the thickness direction.

* * * * *